United States Patent
Shin et al.

(10) Patent No.: US 10,964,943 B2
(45) Date of Patent: Mar. 30, 2021

(54) LITHIUM-COBALT BASED COMPLEX OXIDE HAVING SUPERIOR LIFESPAN CHARACTERISTICS AND CATHODE ACTIVE MATERIAL FOR SECONDARY BATTERIES INCLUDING THE SAME

(71) Applicant: LG Chem, Ltd., Seoul (KR)

(72) Inventors: Sun Sik Shin, Daejeon (KR); Hye Lim Jeon, Daejeon (KR); Myung Ki Lee, Daejeon (KR); Geun Gi Min, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 216 days.

(21) Appl. No.: 16/241,419

(22) Filed: Jan. 7, 2019

(65) Prior Publication Data

US 2019/0148727 A1     May 16, 2019

Related U.S. Application Data

(63) Continuation of application No. 14/907,742, filed as application No. PCT/KR2014/007657 on Aug. 19, 2014, now Pat. No. 10,505,190.

(30) Foreign Application Priority Data

Aug. 19, 2013 (KR) .................. 10-2013-0097828

(51) Int. Cl.
   *H01M 4/525* (2010.01)
   *H01M 4/505* (2010.01)
   (Continued)

(52) U.S. Cl.
   CPC .......... *H01M 4/525* (2013.01); *C01G 51/006* (2013.01); *C01G 51/50* (2013.01); *C01G 53/50* (2013.01);
   (Continued)

(58) Field of Classification Search
   CPC .......................... H01M 4/525; C01G 51/006
   (Continued)

(56) References Cited

U.S. PATENT DOCUMENTS

2002/0037456 A1   3/2002   Hosoya
2004/0200998 A1   10/2004  Park et al.
(Continued)

FOREIGN PATENT DOCUMENTS

CN     101284681 A    10/2008
JP     H10241691 A     9/1998
(Continued)

OTHER PUBLICATIONS

"The impact of Al, Mg or Mn—Mg substitutions on the structure, electrochemistry and thermal stability of LiCoO2 and LiNi1/3Mn1/3Co1/3Co1/3O2", pp. 97, 101, 106-110, China Doctoral Dissertations, Engineering Technology II, Nov. 2010.
(Continued)

*Primary Examiner* — James M Erwin
(74) *Attorney, Agent, or Firm* — Lerner, David, Littenberg, Krumholz & Mentlik, LLP

(57) ABSTRACT

Disclosed is a lithium-cobalt based complex oxide represented by Formula 1 below including lithium, cobalt and manganese wherein the lithium-cobalt based complex oxide maintains a crystal structure of a single O3 phase at a state of charge (SOC) of 50% or more based on a theoretical amount:

$$Li_xCo_{1-y-z}Mn_yA_zO_2 \quad (1)$$

wherein $0.95 \leq x \leq 1.15$, $0 < y \leq 0.3$ and $0 \leq z \leq 0.2$; and
A is at least one element selected the group consisting of Al, Mg, Ti, Zr, Sr, W, Nb, Mo, Ga, and Ni, wherein the at least one element of A is Mg.

15 Claims, 12 Drawing Sheets

(51) Int. Cl.
  *H01M 10/052* (2010.01)
  *C01G 51/00* (2006.01)
  *C01G 53/00* (2006.01)
  *H01M 4/02* (2006.01)
(52) U.S. Cl.
  CPC ......... *H01M 4/505* (2013.01); *H01M 10/052* (2013.01); *C01P 2006/40* (2013.01); *H01M 2004/028* (2013.01); *Y02T 10/70* (2013.01)
(58) Field of Classification Search
  USPC .......................................................... 429/224
  See application file for complete search history.

(56) References Cited

U.S. PATENT DOCUMENTS

| | | | |
|---|---|---|---|
| 2005/0265909 A1 | 12/2005 | Kajiya et al. | |
| 2012/0028099 A1 | 2/2012 | Aoki | |
| 2012/0282523 A1 | 11/2012 | Lu et al. | |
| 2015/0270533 A1 | 9/2015 | Takanashi et al. | |

FOREIGN PATENT DOCUMENTS

| | | |
|---|---|---|
| JP | 2004273168 A | 9/2004 |
| JP | 2009187959 A | 8/2009 |
| KR | 20030083476 A | 10/2003 |
| KR | 20040022234 A | 3/2004 |
| WO | 03015198 A2 | 2/2003 |
| WO | 2014068831 A1 | 5/2014 |

OTHER PUBLICATIONS

International Search Report for Application No. PCT/KR2014/007657 dated Nov. 26, 2014.

Supplementary European Search Report for Application No. EP14837332 dated Feb. 2, 2017.

Takahashi et al., "Development of Lithium-Ion Batteries with a LiCoO2 Cathode Toward High Capacity by Elevationg Charging Potential", Journal of the Electrochemical Society, 155(7) A537-A541, (2008), May 20, 2008 See : abstract, figure 1, figure 2, figure 5, p. A539.

Zeng et al., "Investgationofthe Structmral Changes inLi[NiyMnyCo(1-2y)]O2 (y=0.05) upon Electrochemical Lithium Deintercalation", Chemistry of Materials. 2010, 22, pp. 1209-1219, Jan. 4, 2010 See :abstract, figure 2, figure 3, pp. 1211, 1213.

Zhao et al., "Studies on the performance of LiMnxCo1-xO2 synthesized by doping LiCoO2 with Mn for the Li-ion battery", Chinese Battery Industry, Apr. 2007, vol. 12, No. 2, pp. 105-108 (Abstract only).

[FIG. 1]
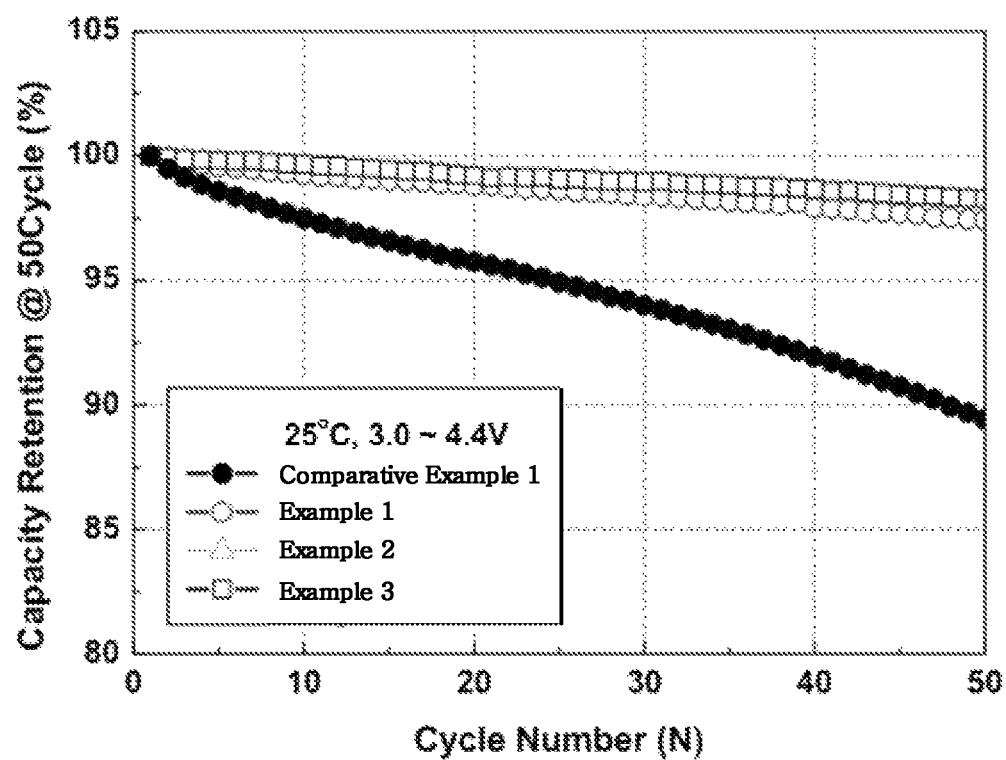

[FIG. 2]
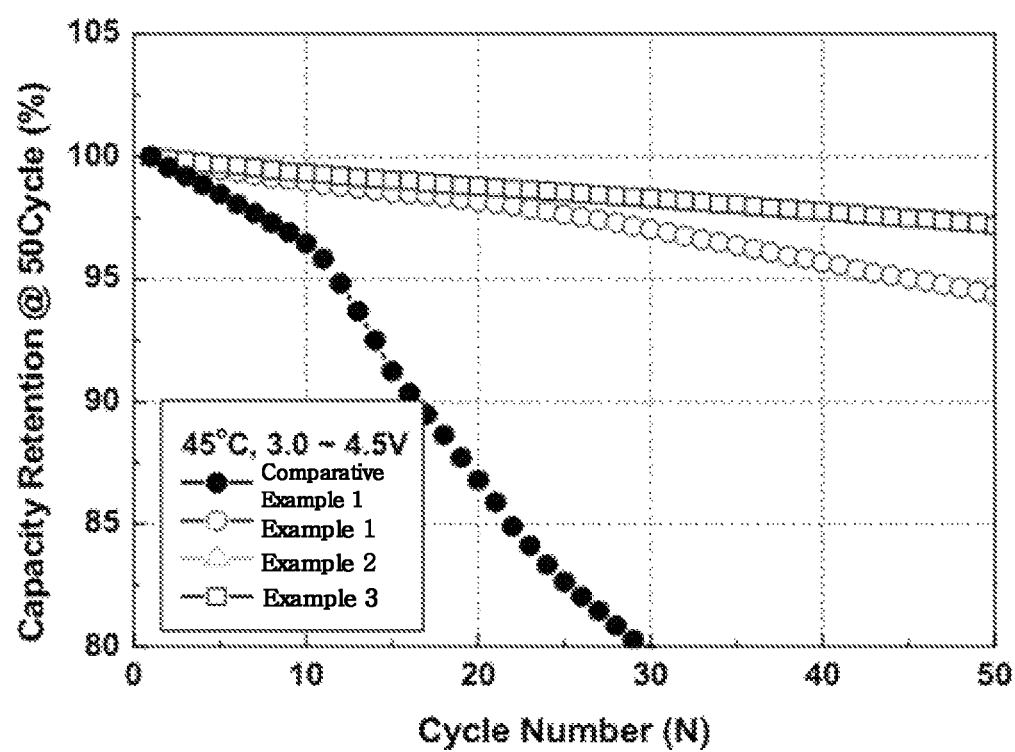

[FIG. 3]
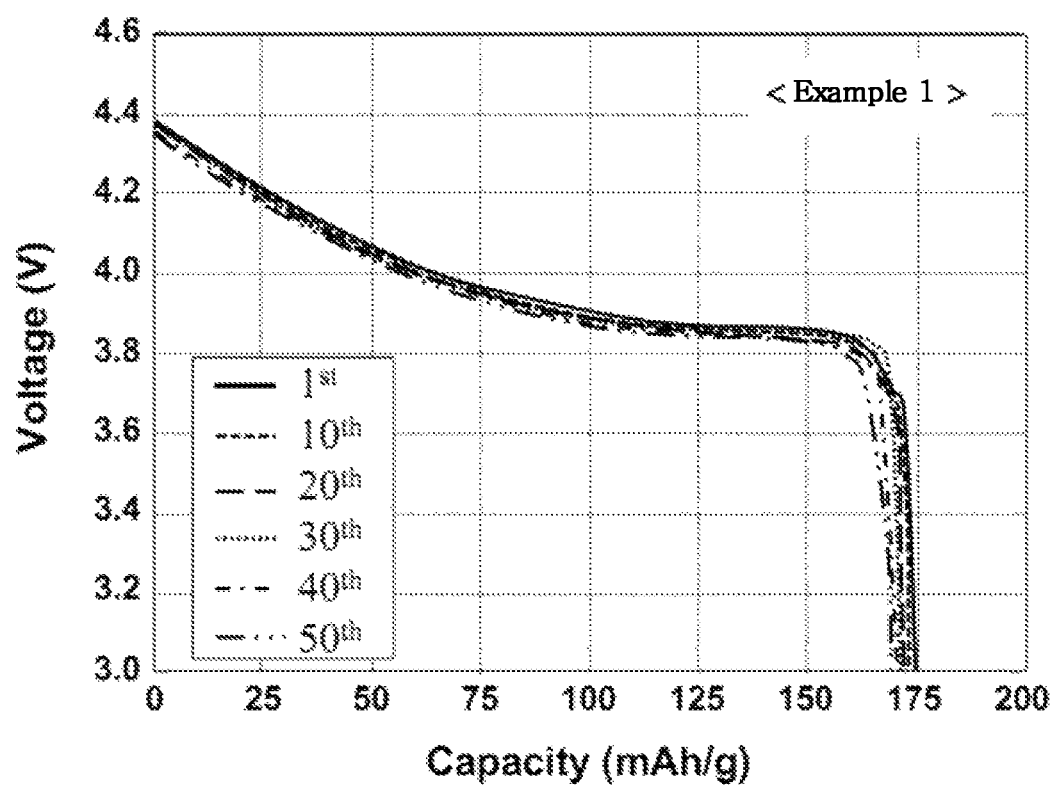

[FIG. 4]
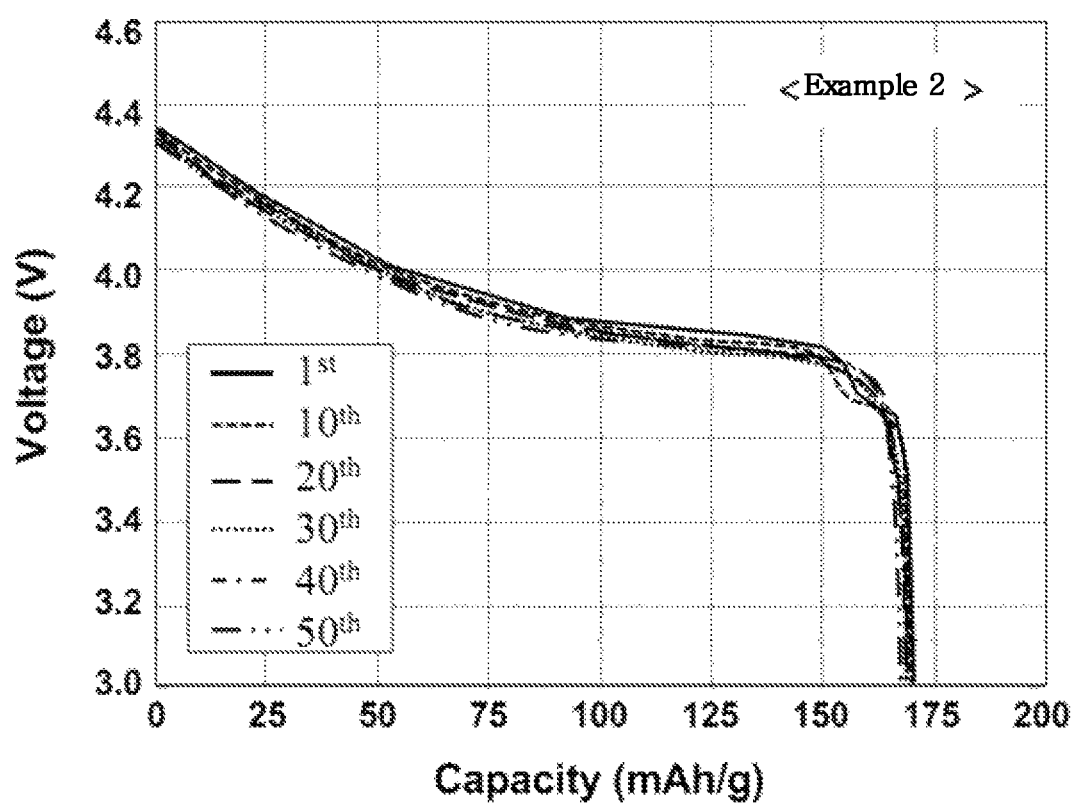

[FIG. 5]
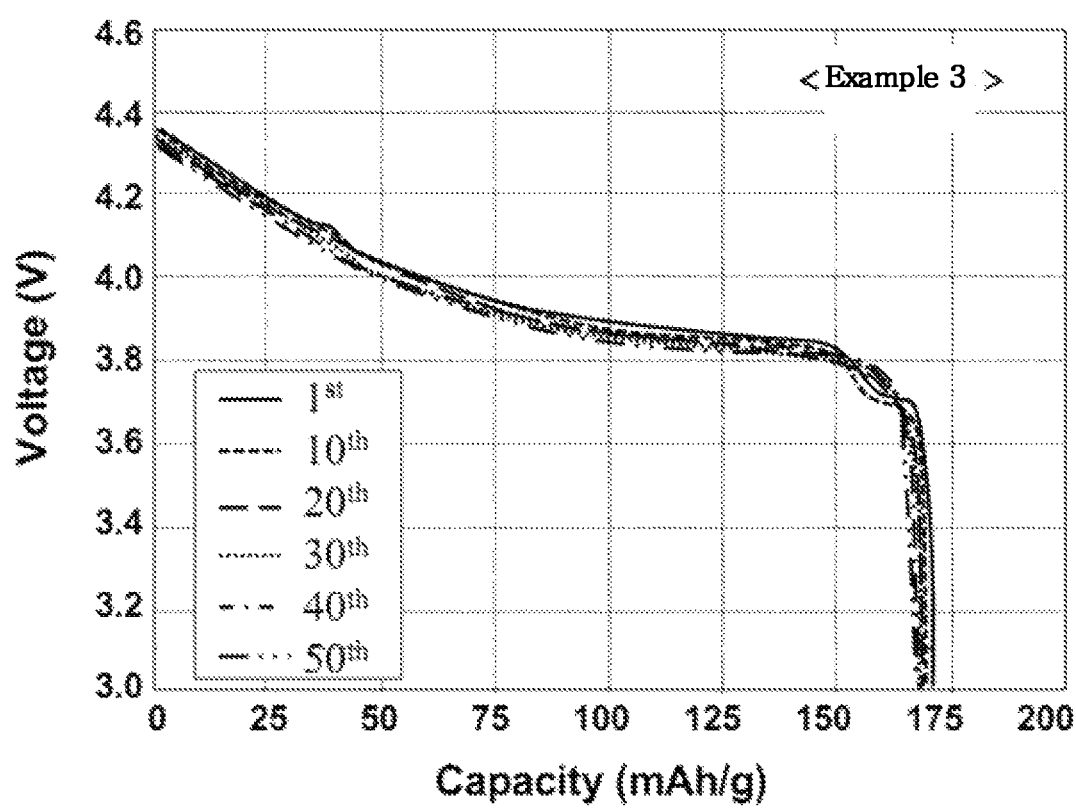

[FIG. 6]
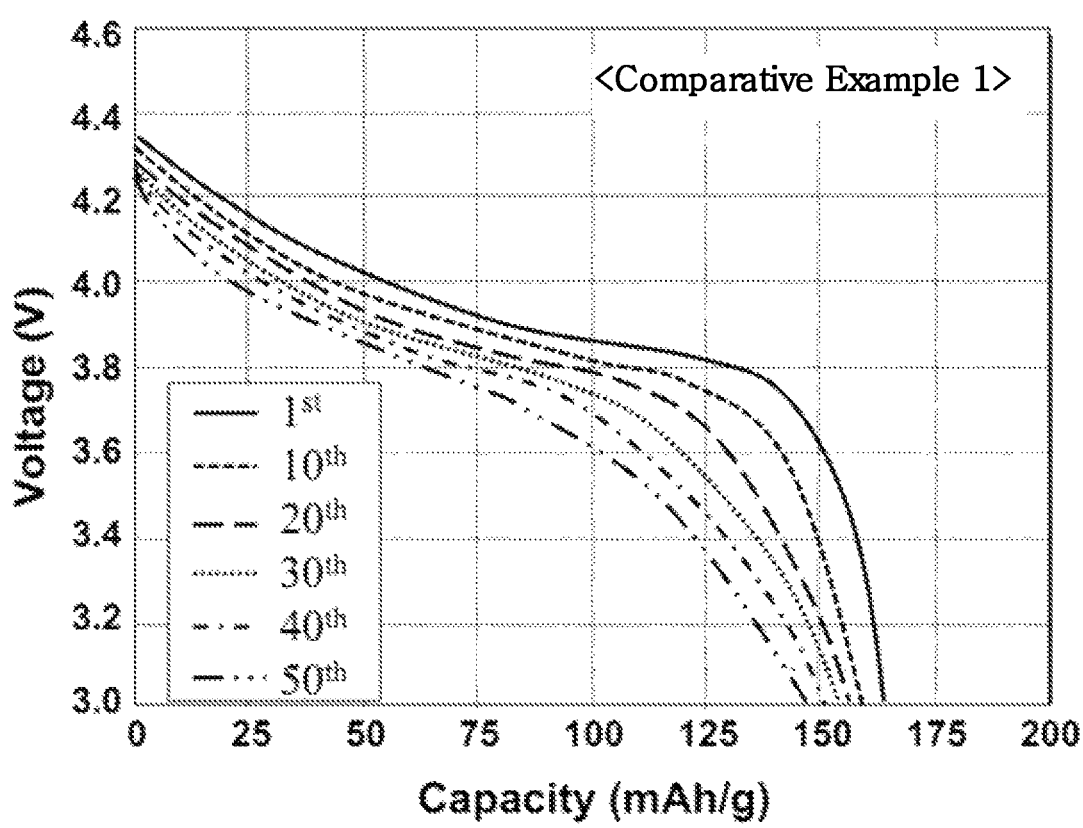

[FIG. 7]
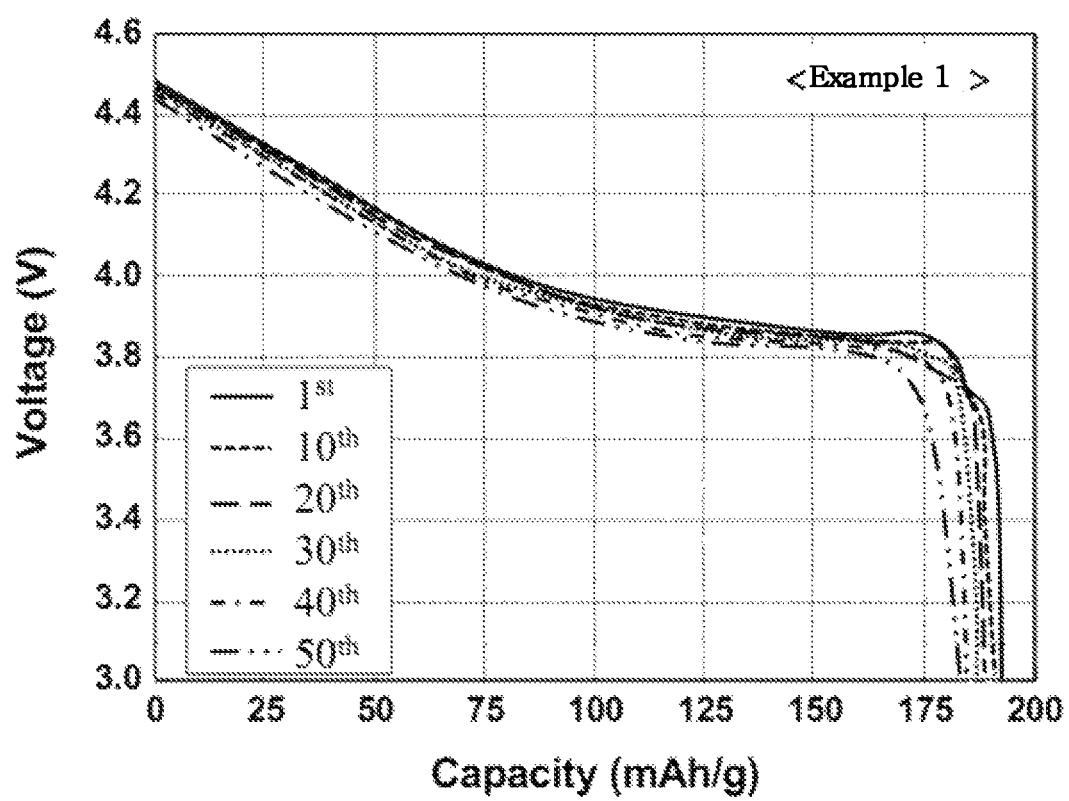

【FIG. 8】
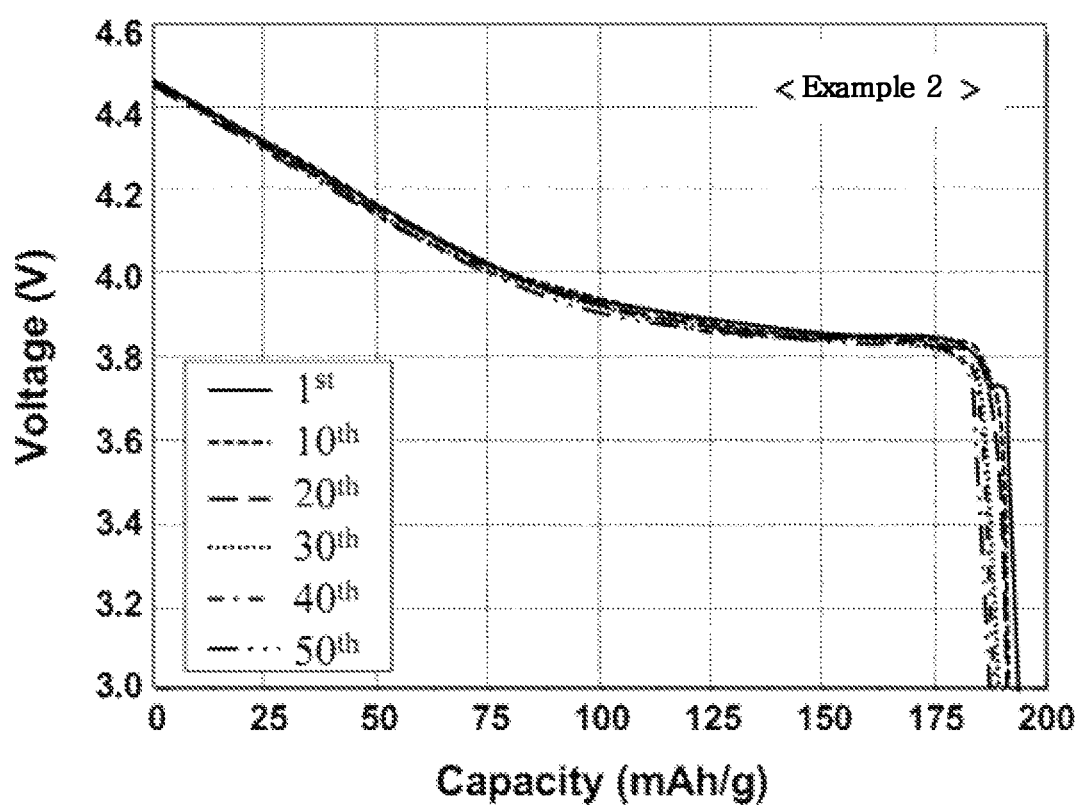

【FIG. 9】
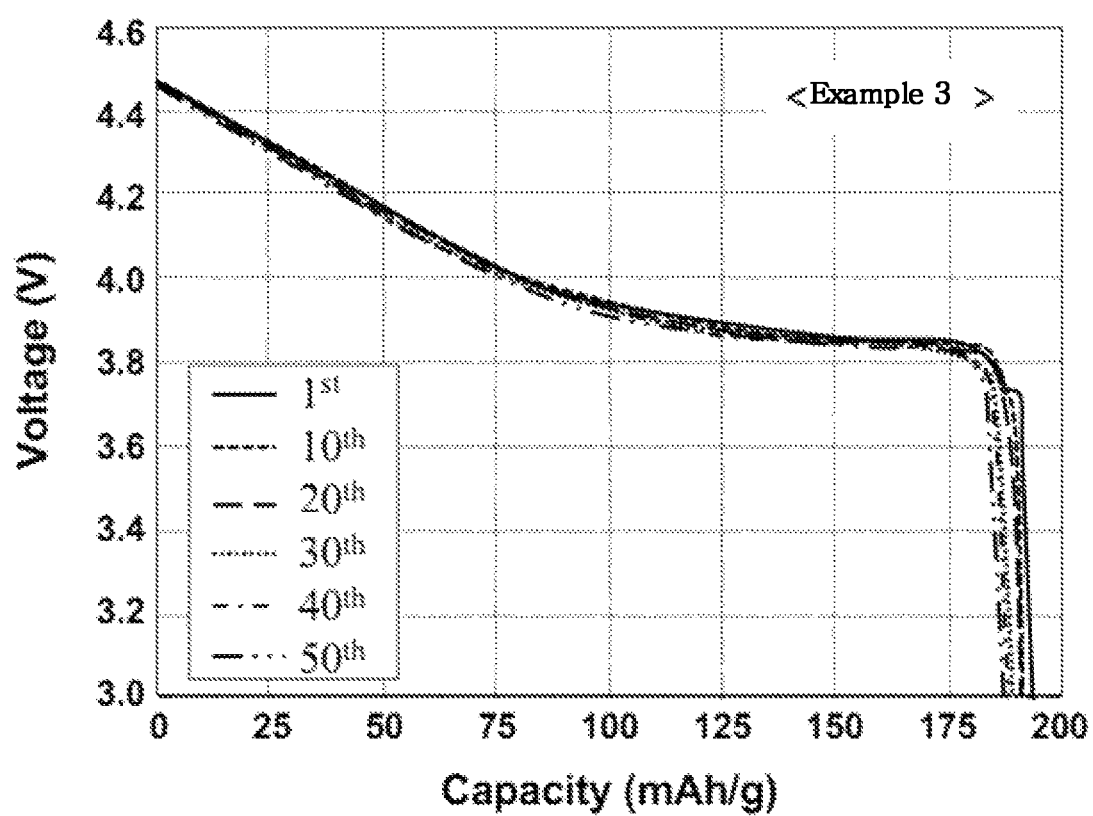

[FIG. 10]
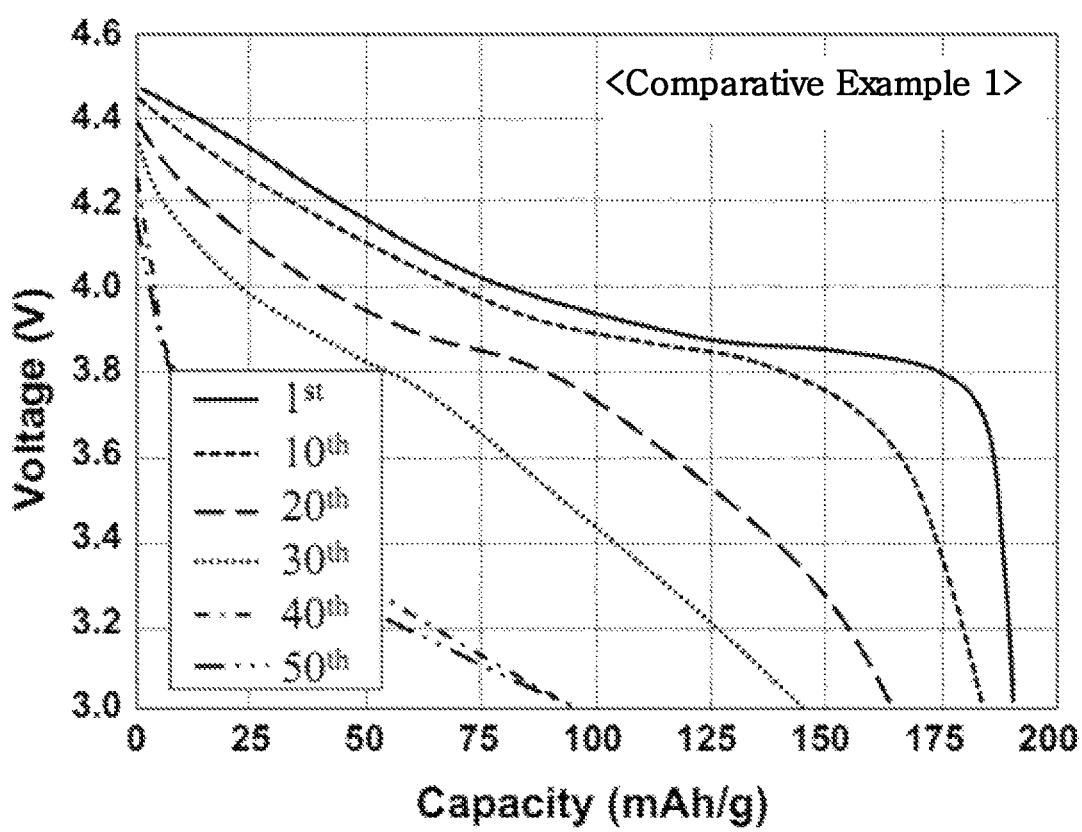

[FIG. 11]
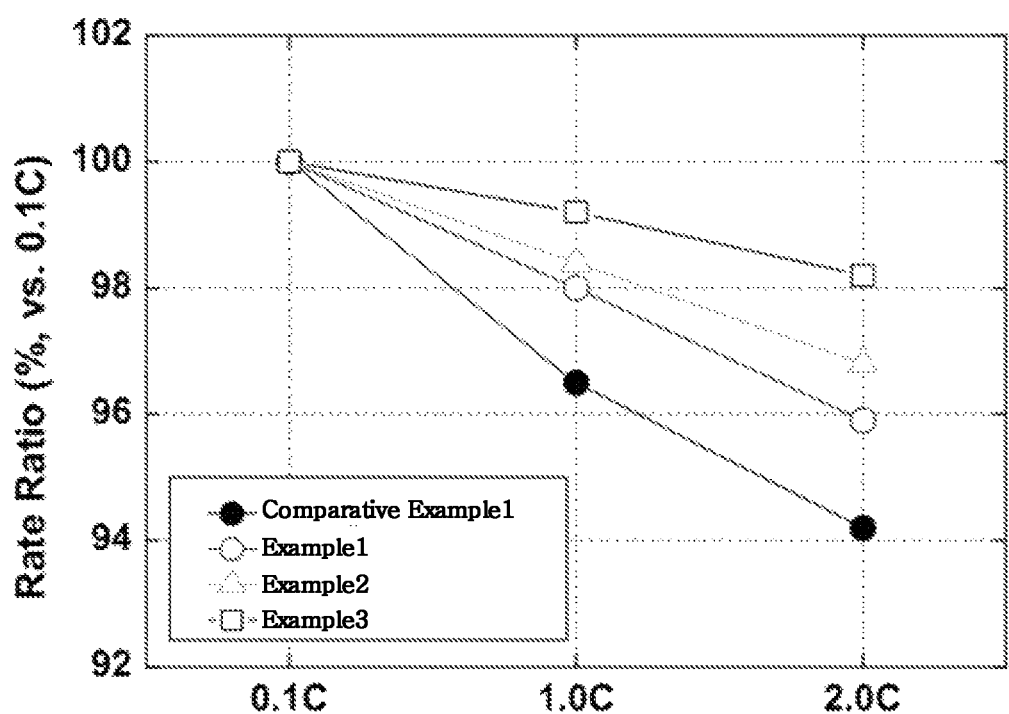

[FIG. 12]
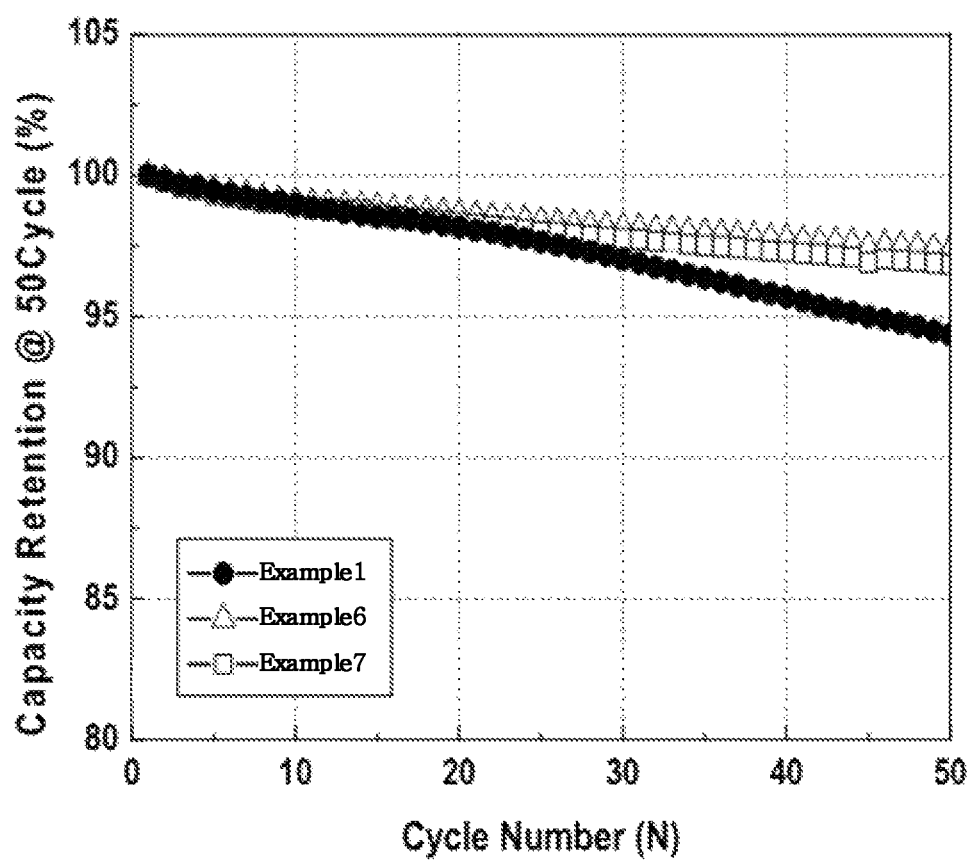

LITHIUM-COBALT BASED COMPLEX OXIDE HAVING SUPERIOR LIFESPAN CHARACTERISTICS AND CATHODE ACTIVE MATERIAL FOR SECONDARY BATTERIES INCLUDING THE SAME

CROSS-REFERENCE TO RELATED APPLICATIONS

This application is a continuation of U.S. patent application Ser. No. 14/907,742, filed Jan. 26, 2016, which is a national phase entry under 35 U.S.C. § 371 of International Application No. PCT/KR2014/007657, filed Aug. 19, 2014, which claims priority to Korean Patent Application No. 10-2013-0097828, filed Aug. 19, 2013, the disclosures of which are incorporated herein by reference.

TECHNICAL FIELD

The present invention relates to a lithium-cobalt based complex oxide having superior lifespan characteristics and a cathode active material for secondary batteries including the same. More particularly, the present invention relates to a lithium-cobalt based complex oxide including lithium and cobalt maintaining a crystal structure of a single O3 phase at a state of charge (SOC) of 50% or more.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, recently, lithium ion batteries are commercially used as a power supply in home electronics such as laptop computers, mobile phones and the like. Furthermore, as interest in environmental problems is increasing, research into electric vehicles (EVs), hybrid electric vehicles (HEVs), and the like that can replace vehicles using fossil fuels, such as gasoline vehicles, diesel vehicles, and the like, which are one of the main causes of air pollution, is underway.

As a cathode of conventionally used lithium ion batteries, lithium cobalt oxides such as $LiCoO_2$ having a layered structure are used. As an anode, graphite based materials are generally used.

Lithium cobalt oxides are currently widely used due to superior physical properties such as superior cycle characteristics as compared to $LiNiO_2$ and $LiMn_2O_4$. To develop secondary batteries having high energy density, cathode active materials having large capacity are required. However, when operating voltage of lithium cobalt oxides are fixed unlike three component-based cathode active materials, it is substantially impossible to enlarge capacities of materials.

Accordingly, lithium cobalt oxides must be used under high voltage to develop secondary batteries having high energy density. However, approximately 50% or more of lithium ions are eliminated under high voltage operation, structures of lithium cobalt oxides collapse and, as such, lifespan characteristics are rapidly degraded.

To overcome this problem and to achieve high energy density, technologies substituting some cobalt with Al, Mg, B or the like, or treating surfaces of lithium cobalt oxides with a metal oxide such as $Al_2O_3$, $Mg_2O$, $TiO_2$ or the like are known.

However, when some cobalt is substituted with metals described above, there is still a problem such as degradation of lifespan characteristics. When a surface of a lithium cobalt oxide is coated with a metal oxide, specific capacity may be reduced due to addition of a coating material that does not directly participate in charge and discharge reaction, and a metal oxide with very low electrical conductivity mainly constitutes the coating material, which results in reduced conductivity. In addition, the coating process reduces active reaction area, thereby increasing interfacial resistance and deteriorating high-rate charge and discharge characteristics.

Therefore, there is an urgent need to develop technology for fundamentally addressing these problems and enhancing high voltage lifespan characteristics of a lithium cobalt oxide.

DISCLOSURE

Technical Problem

The present invention aims to address the aforementioned problems of the related art and to achieve technical goals that have long been sought.

As a result of a variety of intensive studies and various experiments, the inventors of the present invention confirmed that rate characteristics and lifespan characteristics are improved when a lithium-cobalt based complex oxide maintains a crystal structure of a single O3 phase at a state of charge (SOC) of 50% or more, namely, under high voltage, thus completing the present invention.

Technical Solution

In accordance with one aspect of the present invention, provided is a lithium-cobalt based complex oxide including lithium, cobalt and manganese, represented by Formula 1 below, wherein the lithium-cobalt based complex oxide maintains a crystal structure of a single O3 phase at a state of charge (SOC) of 50% or more based on a theoretical amount:

$$Li_xCo_{1-y-z}Mn_yA_zO_2 \qquad (1)$$

wherein 0.95≤x≤1.15, 0<y≤0.3 and 0≤z≤0.2; an

A is at least one element selected the group consisting of Al, Mg, Ti, Zr, Sr, W, Nb, Mo, Ga, and Ni, wherein the at least one element of A is Mg.

The lithium-cobalt based complex oxide may maintain a crystal structure of a single O3 phase even when delithiation progresses in 50% or more of the lithium-cobalt based complex oxide.

As referred to above, when delithiation progresses in 50% or more of general lithium-cobalt based complex oxides, structures of the lithium-cobalt based complex oxides collapse and thereby it is difficult to maintain charging and discharging. Accordingly, lifespan characteristics are degraded.

When the lithium-cobalt based complex oxide has the O3 phase crystal structure, charging and discharging may be stably repeated. However, when the lithium-cobalt based complex oxide has a P3 phase crystal structure, lifespan may be deteriorated.

On the other hand, although delithiation progresses in 50% or more of the lithium-cobalt based complex oxide according to the present invention, the lithium-cobalt based complex oxide may maintain a crystal structure of a single O3 phase. Accordingly, even when lithium ions are intensively eliminated under high voltage, the lithium cobalt complex oxide may be charged and discharged without structural collapse. Accordingly, lifespan characteristics are improved.

In secondary batteries, generally, high voltage is considered an operating voltage exceeding 4.3 V. In one specific embodiment, the lithium-cobalt based complex oxide according to the present invention may maintain the crystal structure of the single O3 phase under operating voltage of 4.35 V or more, more particularly operating voltage of 4.35 V or more to 4.5 V or less. Meanwhile, the lithium-cobalt based complex oxide may have a crystal structure including two phases, namely, O3 phase and P3 phase under operating voltage exceeding 4.5 V.

Inventors of the present invention confirmed that, when, as described above, some cobalt is not doped with Mn, a lithium-cobalt based complex oxide may maintain a crystal structure of a single O3 phase although a large amount of lithium ions are eliminated in the lithium-cobalt based complex oxide, compared a lithium-cobalt based complex oxide not doped with Mn. Accordingly, under high operating voltage, a structure is not collapsed and, as such, lifespan characteristics are improved.

When a doping amount of Mn is greater than 0.3 mol %, the capacity of a secondary battery is reduced and the morphology of the lithium-cobalt based complex oxide is changed. In addition, a surface is not smooth and, as such, tapped density is lowered or specific surface area is enlarged. In addition, problems may occur during processing. A doping amount of Mn, y, may be particularly $0.0001 \leq y \leq 0.2$, particularly $0.001 \leq y \leq 0.1$, more particularly $0.001 \leq y \leq 0.05$.

In one specific embodiment, the amount of the added element A, the z, may be particularly $0 < z \leq 0.2$, particularly $0.001 \leq z \leq 0.1$, more particularly $0.001 \leq z \leq 0.055$. A may be at least one selected from the group consisting of Al, Ti, Ni and Mg, particularly Mg.

As described above, the inventors of the present application confirmed that, when the lithium-cobalt based complex oxide is doped with Mn and the additional element A, lifespan characteristics are improved.

In one specific embodiment, an average particle size of the lithium-cobalt based complex oxide according to the present invention may be 0.5 micrometers to 30 micrometers, particularly 3 micrometers to 25 micrometers.

When the average particle diameter is within the above range, density may be improved and, by a proper particle diameter combination, rate characteristics and electrochemical characteristics may be maintained. Whereas, when average particle diameter is greater than the above particle diameters, rate characteristics and capacity may be lowered. When average particle diameter is less than the above particle diameters, problems may occur during a cathode slurry manufacturing process.

The present invention also provides a cathode active material including the lithium-cobalt based complex oxide, a cathode mixture for secondary batteries including the cathode mixture, and a cathode for secondary batteries including the cathode mixture.

The cathode active material may include, in addition to the lithium-cobalt based complex oxide, a layered structure compound such as lithium nickel oxide ($LiNiO_2$) or the like, or a compound substituted with one or more transition metals; a lithium manganese oxide such as formula $Li_{1+x}Mn_{2-x}O_4$ where x is 0~0.33, $LiMnO_3$, $LiMn_2O_3$, $LiMnO_2$ or the like; lithium copper oxide ($Li_2CuO_2$); vanadium oxides such as $LiV_3O_8$, $LiV_3O_4$, $V_2O_5$, $Cu_2V_2O_7$ or the like; a Ni site type lithium nickel oxide represented by formula $LiNi_{1-x}M_xO_2$ where M is Co, Mn, Al, Cu, Fe, Mg, B or Ga, and x is 0.01 to 0.3); a lithium manganese complex oxide represented by formula $LiMn_{2-x}M_xO_2$ where M is Co, Ni, Fe, Cr, Zn or Ta, and x is 0.01 to 1 or $Li_2Mn_3MO_8$ where M is Fe, Co, Ni, Cu or Zn; a lithium manganese complex oxide of a spinel structure represented by $LiNi_xMn_{2-x}O_4$; $LiMn_2O_4$ where some Li is substituted with alkaline earth metals; disulfide compounds; $Fe_2(MoO_4)_3$; and the like.

Here, in addition to the lithium-cobalt based complex oxide, materials may be included in a range of, for example, 0.1 to 80%, particularly 1 to 60%, more particularly 1 to 50%, based on the total weight of the cathode active material.

The cathode mixture may further selectively include a conductive material, a binder, a filler, and the like, in addition to the cathode active material.

The conductive material is typically added in an amount of 1 to 30 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to a current collector. The binder is typically added in an amount of 1 to 30 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The cathode according to the present invention may be manufactured by coating, on a cathode current collector, a slurry prepared by mixing the cathode mixture including the above-described compounds with a solvent such as NMP or the like and drying and pressing the coated cathode current collector.

The cathode current collector is generally fabricated to a thickness of 3 to 500 μm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The present invention also provides a lithium secondary battery including the cathode, an anode, a separator, and a lithium salt-containing non-aqueous electrolyte.

The anode may be manufactured by, for example, coating an anode mixture including an anode active material on an anode current collector and drying the coated anode current collector. As desired, the anode mixture may further include the above-described components.

Examples of the anode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

The separator is disposed between the cathode and the anode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of an electrolyte and a lithium salt. The electrolyte may be a non-aqueous organic solvent, an organic solid electrolyte, an inorganic solid electrolyte, or the like.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, fluoro-ethylene carbonate (FEC), propene sultone (PRS), fluoro-propylene carbonate (FPC), or the like.

The secondary battery according to the present invention may be used in a battery cell used as a power source of small devices such as wireless devices, mobile phones, tablet PCs, laptop computers, radios or the like and may also be used as a unit battery of a battery module including a plurality of battery cells.

The present invention also provides a device including the secondary battery or battery module. Examples of the device include, but are not limited to, electric vehicles (EVs), hybrid EVs (HEVs), and plug-in HEVs (PHEVs); and devices for storing power.

BRIEF DESCRIPTION OF THE DRAWINGS

FIG. 1 is a graph comparing capacity retention ratios at 25° C. according to Experimental Example 2 of the present invention;

FIG. 2 is a graph comparing capacity retention ratios at 45° C. according to Experimental Example 2 of the present invention;

FIG. 3 is a graph illustrating lifespan characteristics of Example 1, per cycle, at 25° C. according to Experimental Example 2 of the present invention;

FIG. 4 is a graph illustrating lifespan characteristics of Example 2, per cycle, at 25° C. according to Experimental Example 2 of the present invention;

FIG. 5 is a graph illustrating lifespan characteristics of Example 3, per cycle, at 25° C. according to Experimental Example 2 of the present invention;

FIG. 6 is a graph illustrating lifespan characteristics of Comparative Example 1, per cycle, at 25° C. according to Experimental Example 2 of the present invention;

FIG. 7 is a graph illustrating lifespan characteristics of Example 1, per cycle, at 45° C. according to Experimental Example 2 of the present invention;

FIG. 8 is a graph illustrating lifespan characteristics of Example 2, per cycle, at 45° C. according to Experimental Example 2 of the present invention;

FIG. 9 is a graph illustrating lifespan characteristics of Example 3, per cycle, at 45° C. according to Experimental Example 2 of the present invention;

FIG. 10 is a graph illustrating lifespan characteristics of Comparative Example 1, per cycle, at 25° C. according to Experimental Example 2 of the present invention;

FIG. 11 is a graph comparing rate characteristics according to Experimental Example 2 of the present invention; and FIG. 12 is a graph comparing capacity retention ratios at 45° C. according to Experimental Example 3.

BEST MODE

Now, the present invention will be described in more detail with reference to the following examples. These examples are provided only for illustration of the present invention and should not be construed as limiting the scope and spirit of the present invention.

Example 1

A Co source, Mn source and Li source were sufficiently mixed using a dry method to obtain a mixture including Li:Co:Mn:O in a molar ratio of 1.03:0.9982:0.0018:2. The mixture was plasticized at 900~1200° C. for 5 to 20 hours. The obtained product was ground and classified. As a result, a lithium-cobalt based complex oxide represented by $Li_{1.03}Co_{0.9989}Mn_{0.0011}O_2$ was obtained.

Example 2

A Co source, Mn source and Li source were sufficiently mixed using a dry method to obtain a mixture including Li:Co:Mn:O in a molar ratio of 1.03:0.9969:0.0031:2. The mixture was plasticized at 900~1200° C. for 5 to 20 hours. The obtained product was ground and classified. As a result, a lithium-cobalt based complex oxide represented by $Li_{1.03}Co_{0.9982}Mn_{0.0018}O_2$ was obtained.

Example 3

A Co source, Mn source and Li source were sufficiently mixed using a dry method to obtain a mixture including Li:Co:Mn:O in a molar ratio of 1.03:0.9957:0.0043:2. The mixture was plasticized at 900~1200° C. for 5 to 20 hours. The obtained product was ground and classified. As a result, a lithium-cobalt based complex oxide represented by $Li_{1.03}Co_{0.9975}Mn_{0.0025}O_2$ was obtained.

Example 4

A Co source, Mn source and Li source were sufficiently mixed using a dry method to obtain a mixture including Li:Co:Mn:O in a molar ratio of 1.03:0.9933:0.0067:2. The mixture was plasticized at 900~1200° C. for 5 to 20 hours. The obtained product was ground and classified. As a result, a lithium-cobalt based complex oxide represented by $Li_{1.03}Co_{0.9960}Mn_{0.0040}O_2$ was obtained.

Example 5

A Co source, Mn source and Li source were sufficiently mixed using a dry method to obtain a mixture including Li:Co:Mn:O in a molar ratio of 1.03:0.9519:0.0481:2. The mixture was plasticized at 900~1200° C. for 5 to 20 hours. The obtained product was ground and classified. As a result, a lithium-cobalt based complex oxide represented by $Li_{1.03}Co_{0.9550}Mn_{0.0450}O_2$ was obtained.

Example 6

A Co source, Mn source, Mg source and Li source were sufficiently mixed using a dry method to obtain a mixture including Li:Co:Mn:Mg:O in a molar ratio of 1.03:0.9988:0.0011:0.0001:2. The mixture was plasticized at 900~1200° C. for 5 to 20 hours. The obtained product was ground and classified. As a result, a lithium-cobalt based complex oxide represented by $Li_{1.03}Co_{0.9988}Mn_{0.0011}Mg_{0.0001}O_2$ was obtained.

Example 7

A Co source, Mn source, Mg source and Li source were sufficiently mixed using a dry method to obtain a mixture including Li:Co:Mn:Mg:O in a molar ratio of 1.03:0.9986:0.0011:0.0003:2. The mixture was plasticized at 900~1200° C. for 5 to 20 hours. The obtained product was ground and classified. As a result, a lithium-cobalt based complex oxide represented by $Li_{1.03}Co_{0.9986}Mn_{0.0011}Mg_{0.0003}O_2$ was obtained.

Comparative Example 1

A Co source and Li source were sufficiently mixed using a dry method to obtain a mixture including Li:Co:O in a molar ratio of 1.03:1:2. The mixture was plasticized at 900~1200° C. for 5 to 20 hours. The obtained product was ground and classified. As a result, a lithium-cobalt based complex oxide represented by $Li_{1.03}CoO_2$ was obtained.

Experimental Example 1

Lithium-cobalt based complex oxide samples manufactured according to Examples 1 and 4, and Comparative Example 1 were prepared. An X-ray diffraction (XRD) pattern of each sample was collected using a Siemens D500 diffractometer equipped with copper target X-ray tube and diffracted beam monochromator. Since the samples are thick and wide, the samples were manufactured in a flat and rectangular powder-bed shape such that volume irradiated by X-ray beam is constant. Using GSAS of a Rietveld refinement program disclosed in [A. C. Larson and R. B. Von Dreele, "General Structure Analysis System (GSAS)", Los Alamos National Laboratory Report LAUR 86-748 (2000)], a lattice constant of a unit cell was calculated. Results are summarized in Table 1 below.

Here, crystal structures of unit cells manufactured according to Example 1 and Comparative Example 1 were measured in a full voltage range. The lithium-cobalt based complex oxide sample manufactured according to Example 4 maintained a crystal structure of a single O3 phase in voltage of 4.4 V or more. A crystal structure was not measured below the voltage range.

TABLE 1

| Cell parameter | | Voltage (V) | | | | | | | |
|---|---|---|---|---|---|---|---|---|---|
| | | 4.3 | | 4.35 | | 4.4 | | 4.45 | 4.5 |
| Comparative Example 1 | a | 2.809 | | 2.809 | 2.812 | 2.810 | 2.811 | 2.812 2.810 | 2.812 |
| | c | 14.45 | | 14.44 | 14.40 | 14.43 | 14.39 | 14.40 14.36 | 14.34 |
| Example 1 | a | 2.809 | | 2.810 | | 2.810 | | 2.810 | 2.811 |
| | c | 14.44 | | 14.43 | | 14.42 | | 14.41 | 14.40 |
| Example 4 | a | — | | — | | 2.810 | | 2.811 | 2.812 |
| | c | — | | — | | 14.42 | | 14.42 | 14.40 |

Referring to Table 1, the lithium-cobalt based oxides manufactured according to Examples 1 and 4 maintained crystal structures of single O3 phases under full charging voltage not exceeding 4.50 V. On the other hand, the lithium-cobalt based complex oxide manufactured according to Comparative Example 1 showed another phase, in addition to an O3 phase, over 4.35 V, resulting in two phases. Subsequently, at 4.50 V, all O3 phases transitioned to the another phase, resulting in formation of one phase.

Experimental Example 2

Using each of the lithium-cobalt based complex oxides manufactured according to Example 1 to 3 and Comparative Example 1, the lithium-cobalt based complex oxide:a conductive material (Denka black):a binder (PVdF) in a weight ratio of 95:2.5:2.5 were added to NMP and then mixed to manufacture a cathode mixture. The cathode mixture was coated to a thickness of 200 μm on an aluminum foil and then pressed and dried. As a result, a cathode was manufactured.

To manufacture a lithium secondary battery, Li metal was used as an anode and a carbonate based electrolyte, namely, 1 mol $LiPF_6$ dissolved in a mixture of ethyl carbonate (EC) and ethyl methyl carbonate (EMC) mixed in a ratio of 1:1 was used as an electrolyte.

Measurement of Initial Charge and Discharge Capacities, and Efficiencies

When the manufactured lithium secondary batteries were charged and discharged at 0.1 C in a voltage range of 3.0 V to 4.4 V, initial capacities and efficiencies were measured. Results are summarized in Table 2 below.

Measurement of Lifespan Characteristics

After charging and discharging the manufactured lithium secondary batteries once at 0.1 C in chambers of 25° C. and in a voltage range of 3.0 V to 4.4 V, lifespan characteristics were measured fifty times while charging at 0.5 C and discharging at 1 C. After charging and discharging once at 0.1 C in a 45° C. chamber and in a voltage range of 3.0 V to 4.5 V, lifespan characteristics were measured fifty times while charging at 0.5 C and discharging at 1 C. Results are summarized in Table 2 below and illustrated in FIGS. 1 to 10.

Measurement of Rate Characteristics

Rate characteristics of the manufactured lithium secondary batteries were tested in a voltage range of 3.0 V to 4.4 V and capacity at each C-rate with respect to capacities at 0.1 C was calculated. Results are summarized in Table 2 below and illustrated in FIG. 11.

TABLE 2

| | Initial capacity and efficiency | | | Rate characteristics | | Lifespan characteristics (%, at 50 cycles) | |
|---|---|---|---|---|---|---|---|
| | Charge (mAh/g) | Discharge (mAh/g) | Efficiency (%) | 1.0 C | 2.0 C | 3.0~4.4 V (25° C.) | 3.0~4.5 V (45° C.) |
| Example 1 | 180.5 | 177.4 | 98.2 | 98.0 | 95.9 | 97.4 | 94.4 |
| Example 2 | 180.3 | 177.1 | 98.3 | 98.4 | 96.8 | 98.2 | 97.1 |
| Example 3 | 179.6 | 176 | 98.0 | 99.2 | 98.2 | 98.3 | 97.2 |
| Comparative Example 1 | 180.9 | 176.8 | 97.8 | 93.9 | 88.8 | 89.4 | 67.9 |

Referring to Table 2 and FIGS. 1 to 10, initial capacities and efficiencies of lithium secondary batteries using the lithium-cobalt based complex oxides manufactured according to Examples 1 to 3 were slightly higher but were not greatly different, when compared to those of a lithium secondary battery using the lithium-cobalt based complex oxide manufactured according to Comparative Example 1. However, rate characteristics and lifespan characteristics of the lithium secondary batteries using the lithium-cobalt based complex oxides manufactured according to Examples 1 to 3 were superior, when compared to those of a lithium secondary battery using the lithium-cobalt based complex oxide manufactured according to Comparative Example 1. In particular, rate characteristics at a high rate and lifespan characteristics at high temperature were vastly superior.

As described in Experimental Example 1, the lithium-cobalt based complex oxide manufactured according to Example 1 maintained the crystal structure of the single O3 phase even under high voltage. On the other hand, the O3 phase of the lithium-cobalt based complex oxide manufactured according to Comparative Example 1 is partially or entirely changed into the P3 phase and thereby charge and discharge are not maintained and irreversible capacity increases.

For reference, in FIGS. 1 and 2, graphs of Example 2 overlap with graphs of Example 3 and thereby the graphs are not easily distinguished.

Experimental Example 3

Using each of the lithium-cobalt based complex oxides manufactured according to Examples 1, 6 and 7, the lithium-cobalt based complex oxide:a conductive material (Denka black):a binder (PVdF) in a weight ratio of 95:2.5:2.5 were added to NMP and then mixed to manufacture a cathode mixture. The cathode mixture was coated to a thickness of 200 μm on an aluminum foil and then pressed and dried. As a result, a cathode was manufactured.

To manufacture a lithium secondary battery, Li metal was used as an anode and a carbonate based electrolyte, namely, 1 mol $LiPF_6$ dissolved in a mixture of ethyl carbonate (EC) and ethyl methyl carbonate (EMC) mixed in a ratio of 1:1 was used as an electrolyte.

After charging and discharging the manufactured lithium secondary batteries once at 0.1 C in a 45° C. chamber and in a voltage range of 3.0 V to 4.5 V, lifespan characteristics were measured fifty times while charging at 0.5 C and discharging at 1 C. Results are illustrated in FIG. 12.

Referring to FIG. 12, the lithium-cobalt based complex oxides, which are doped with Mg, manufactured according to Examples 6 and 7 showed excellent lifespan characteristics, when compared with the lithium-cobalt based complex oxide manufactured according to Example 1.

Those skilled in the art will appreciate that various modifications, additions and substitutions are possible, without departing from the scope and spirit of the invention as disclosed in the accompanying claims.

INDUSTRIAL APPLICABILITY

As described above, a lithium-cobalt based complex oxide according to the present invention maintains a crystal structure of a single O3 phase at a state of charge (SOC) of 50% or more, namely, under high voltage and thereby collapse of a structure of the lithium-cobalt based complex oxide is prevented, and, accordingly, rate characteristics and lifespan characteristics are improved.

The invention claimed is:

1. A lithium-cobalt based complex oxide represented by Formula 1 below comprising lithium, cobalt and manganese, wherein the lithium-cobalt based complex oxide maintains a crystal structure of a single O3 phase at a state of charge (SOC) of 50% or more based on theoretical capacity:

$$Li_xCo_{1-y-z}Mn_yA_zO_2 \quad (1)$$

wherein $0.95 \leq x \leq 1.15$, $0 < y \leq 0.3$ and $0 < z \leq 0.2$; and

A is at least one element selected the group consisting of Al, Mg, Ti, Zr, Sr, W, Nb, Mo, Ga, and Ni, wherein the at least one element of A contains Mg, wherein the lithium-cobalt based complex oxide maintains the crystal structure of the single O3 phase under operating voltage of 4.35 V or more.

2. The lithium-cobalt based complex oxide according to claim 1, wherein the lithium-cobalt based complex oxide maintains the crystal structure of the single O3 phase when delithiation progresses in 50% or more of the lithium-cobalt based complex oxide.

3. The lithium-cobalt based complex oxide according to claim 1, wherein the lithium-cobalt based complex oxide maintains the crystal structure of the single O3 phase under operating voltage of 4.35 V or more to 4.5 V or less.

4. The lithium-cobalt based complex oxide according to claim 1, wherein y is $0.0001 \leq y \leq 0.2$.

5. The lithium-cobalt based complex oxide according to claim 1, wherein A is Mg.

6. The lithium-cobalt based complex oxide according to claim 1, wherein an average particle size of the lithium-cobalt based complex oxide is 0.5 micrometers to 30 micrometers.

7. A cathode active material comprising the lithium-cobalt based complex oxide according to claim 1.

8. A cathode mixture for secondary batteries comprising the cathode active material according to claim 7.

9. A cathode for secondary batteries comprising the cathode mixture for secondary batteries according to claim 8 coated on a collector.

10. A lithium secondary battery comprising the cathode for secondary batteries according to claim 9.

11. A battery module comprising the lithium secondary battery according to claim 10 as a unit battery.

12. A device comprising the lithium secondary battery according to claim 10.

13. A device comprising the battery module according to claim 11.

14. The device according to claim 12, wherein the device is a mobile phone, a tablet PC, a laptop computer, an electric vehicle, a hybrid electric vehicle, a plug-in hybrid electric vehicle, or a system for storing power.

15. The device according to claim 13, wherein the device is a mobile phone, a tablet PC, a laptop computer, an electric vehicle, a hybrid electric vehicle, a plug-in hybrid electric vehicle, or a system for storing power.

* * * * *